(12) United States Patent
Pyykonen

(10) Patent No.: US 7,124,845 B2
(45) Date of Patent: Oct. 24, 2006

(54) BOTTOM PAN FOR A SNOWMOBILE

(75) Inventor: Tapani Pyykonen, Rovaniemi (FI)

(73) Assignee: BRP Finland Oy, Rovaniemi (FI)

( * ) Notice: Subject to any disclaimer, the term of this patent is extended or adjusted under 35 U.S.C. 154(b) by 0 days.

(21) Appl. No.: 10/770,490

(22) Filed: Feb. 4, 2004

(65) Prior Publication Data

US 2004/0154850 A1 Aug. 12, 2004

Related U.S. Application Data

(60) Provisional application No. 60/444,652, filed on Feb. 4, 2003.

(51) Int. Cl.
*B62M 29/00* (2006.01)
*B62D 39/00* (2006.01)

(52) U.S. Cl. .................. 180/182; 180/190; 296/1.02

(58) Field of Classification Search ........... 180/190, 180/191, 193, 194, 195, 182, 89.1; 296/76, 296/106, 56, 187.01, 1.02; 280/288.2
See application file for complete search history.

(56) References Cited

U.S. PATENT DOCUMENTS

| | | | | |
|---|---|---|---|---|
| 3,613,205 A | * | 10/1971 | Takada | 29/897.2 |
| 4,620,604 A | * | 11/1986 | Talbot | 180/190 |
| 5,038,882 A | * | 8/1991 | Zulawski | 180/190 |
| 5,503,242 A | * | 4/1996 | Jeffers | 180/182 |
| 5,967,534 A | * | 10/1999 | Bradley, Jr. | 280/47.371 |
| 5,996,717 A | * | 12/1999 | Hisadomi | 180/182 |
| 6,009,966 A | * | 1/2000 | Olson et al. | 180/182 |
| 6,170,589 B1 | * | 1/2001 | Kawano et al. | 180/190 |
| 6,491,125 B1 | * | 12/2002 | Girouard et al. | 180/190 |
| 6,513,612 B1 | * | 2/2003 | Moriyama et al. | 180/182 |
| 6,595,812 B1 | * | 7/2003 | Haney | 440/11 |
| 2003/0034619 A1 | * | 2/2003 | Bergstrom | 280/28 |

OTHER PUBLICATIONS

Ski-Doo Parts Catalog 2001, Formula Deluxe 500/600/700, No. 484400143, 2000, p. E3 and E4.

* cited by examiner

*Primary Examiner*—Lesley D. Morris
*Assistant Examiner*—Daniel Yeagley
(74) *Attorney, Agent, or Firm*—Osler, Hoskin & Harcourt LLP

(57) ABSTRACT

The present invention is directed to a snowmobile with a frame that supports an engine. The snowmobile also includes an endless track operatively connected to the engine to propel the frame. At least one ski is disposed on the frame to steer the frame. To enclose the engine, at least one fairing is attached to the frame. At least one ski well is incorporated in the at least one fairing. At least a portion of a front suspension is disposed within the ski well. The at least one ski is disposed on the front suspension. A lifting handle is incorporated into the at least one ski well to permit lifting of the frame's front end by a rider.

16 Claims, 10 Drawing Sheets

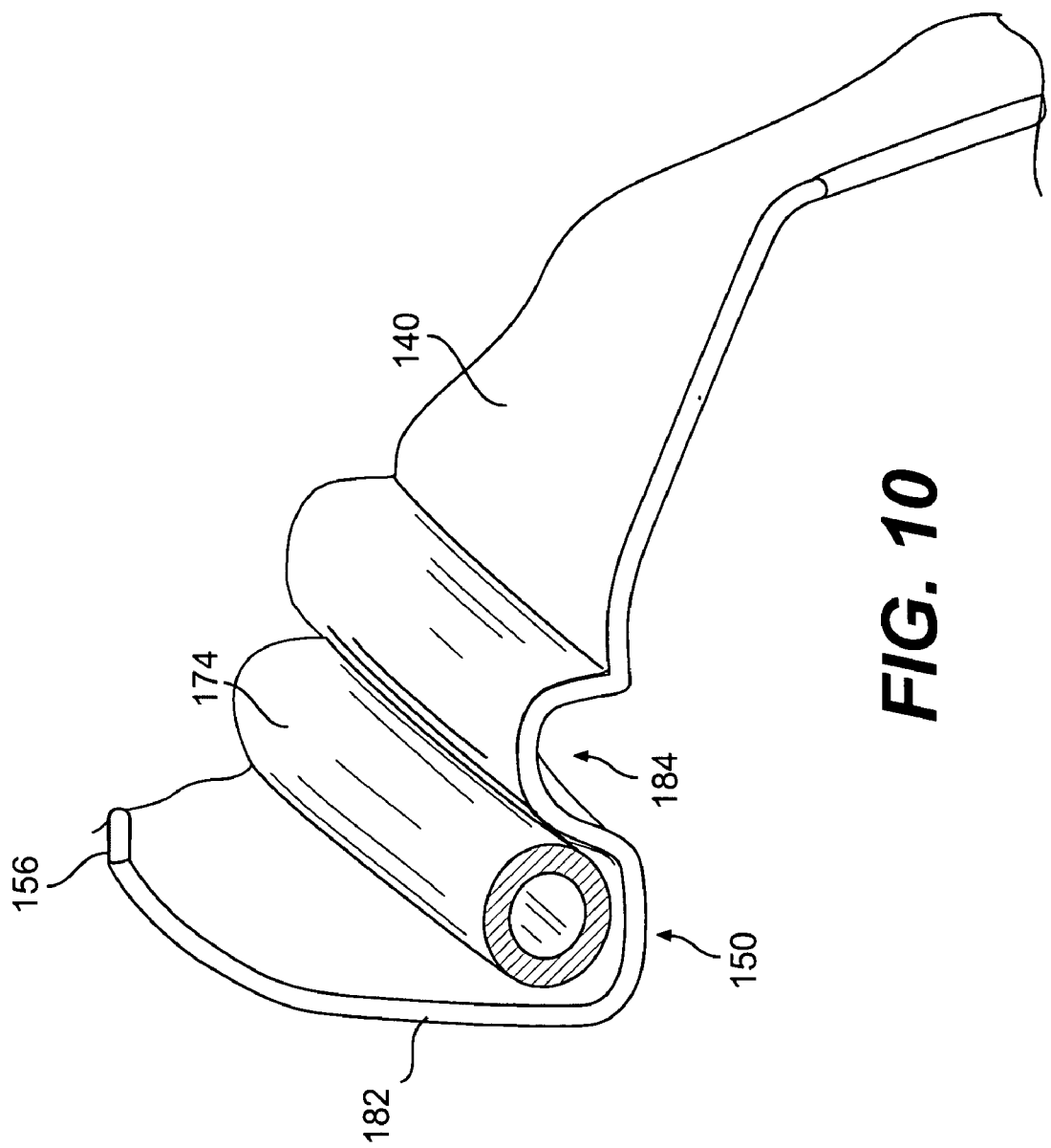

BOTTOM PAN FOR A SNOWMOBILE

This application relates to and claims priority to U.S. Provisional Application No. 60/444,652 entitled "A Bottom Pan For a Snowmobile", filed on Feb. 4, 2003. The disclosure of which is incorporated herein by reference.

BACKGROUND OF THE INVENTION

1. Field of the Invention

The present invention relates to the construction of a snowmobile. More particularly, the present invention concerns the construction of a bottom pan for the snowmobile.

2. Description of Related Art

FIG. 1 illustrates a conventional snowmobile 10 of the type manufactured by Bombardier Inc. of Montreal, Quebec, Canada. The snowmobile 10 includes a body 12 having a front end 14 and a rear end 16. A seat 18 is positioned at the rear end 16 of the snowmobile 10 above a tunnel 20, which is an inverted, U-shaped structure. The tunnel 20 is positioned above an endless track 22 that is disposed on a rear suspension 24. The endless track 22 is a flexible band that travels on the rear suspension 24 to propel the snowmobile 10. The endless track 22 is operatively connected to an engine 26, which is disposed toward the front end 14 of the snowmobile 10.

Two skis 28 are suspended at the front end 14 of the snowmobile 10 from a front suspension 30. The front suspension 30 includes, among other elements, a leg 32 with a trailing arm 34 connected thereto. The trailing arm 34 is connected to the body 12 of the snowmobile 10 through a pivot 36 so that the trailing arm 34 may pivot up and down relative to the snowmobile body 12 as the snowmobile 10 travels over the ground 38.

The skis 28 are operatively connected to a steering handlebar 40 disposed in front of the seat 18. As the steering handlebar 40 is turned from right to left, the skis 28 turn accordingly. In this manner, the snowmobile 10 may be steered through the snow on which it travels. A windshield 42 is disposed forwardly of the steering handlebar 40 to deflect wind from the rider positioned on the seat 18.

As illustrated in FIG. 1, the snowmobile 10 also includes a front bumper 44, which is disposed at the front end 14. The bumper 44 typically incorporates or forms a handle so that the rider may lift the front end 14 of the snowmobile 10. Similarly, the skis 28 also include handles 46 that permit the rider to lift the skis 28 from the snow, when necessary.

During use, snowmobiles 10 often get stuck in the snow on which they are traveling. This occurs most frequently in deep snow. There are at least two reasons why a snowmobile may become stuck in deep snow. In the first instance, natural snow frequently includes depressions or holes in which the snowmobile 10 may become "trapped" such that it cannot power itself out. In the second instance, if a rider applies too much power to the endless track 22, in some cases, the snowmobile 10 may not move forward but, instead, may "dig" itself into the snow, creating a hole or depression from which the snowmobile 10 cannot escape under its own propulsive power. In either case, the rider must dismount from the snowmobile 10 and lift the front end 14 of the snowmobile 10 from its position in the snow. Sometimes, it is also necessary for the rider to lift the rear end of the snowmobile 10 from the snow. Accordingly, a handle 48 often is included at the rear of the snowmobile 10 for this purpose.

Getting caught in a hole or depression (whether naturally occurring or made by the operation of the snowmobile 10) is but one reason for which handles 44, 46, 48 are provided on the conventional snowmobile 10.

Snowmobiles 10 are often carried in the back of a truck or on a trailer and are often stored in garages when not in use. Since snowmobiles 10 are designed to be as light in weight as possible, they may be moved around by riders with some degree of ease, even when they are not operating under their own propulsive power. What this means is that the average rider may lift at least a portion of the front end 14 or the rear end 16 of a snowmobile 10, using one of the handles 44, 46, 48, so that the snowmobile 10 may be properly positioned in the rear of a truck, on a trailer, or in a corner of a garage.

In addition, the turning radius of a snowmobile 10 is usually quite large by comparison with wheeled vehicles such as all terrain vehicles ("ATVs") or automobiles. As a result, when turning a snowmobile 10 in a confined space, it is sometimes necessary for a rider to dismount from the snowmobile 10, lift the front end 14 and/or rear end 16, and redirect the snowmobile 10 so that it does not strike any obstacles within its path. Sometimes, due to the large turning radius of the snowmobile 10, it is necessary to manually position the snowmobile 10 (using the handles 44, 46, 48) simply to get the vehicle pointed in the right traveling direction.

Several kinds of snowmobiles 10 are known to exist. Some are designed for racing use. Others are designed for all-around trail use. Still others are designed for use in wooded areas and, as such, as referred to as "utility snowmobiles." Since utility snowmobiles are often driven into wooded areas, and since such snowmobiles also have a large turning radius (like all snowmobiles), occasionally, the turning radius of the vehicle is not sufficient for the snowmobile to avoid a tree or other natural obstacle. Accordingly, as discussed above, it is necessary for the rider to dismount from the snowmobile and manually correct the travel direction of the vehicle. The design of a conventional utility snowmobile is much like the snowmobile 10. As such, reference to the snowmobile 10 will be understood to encompass the components of a utility snowmobile for purposes of the discussion herein.

In the case of the utility snowmobile, the front bumper 44 typically is positioned a small distance from the outside, upper edge of a bottom pan 50 so that the rider may slide his or her fingers between the front bumper 44 and the bottom pan 50. In this manner, the front bumper 44 forms a handle that is easily grasped by the rider when standing at the front end 14 of the snowmobile 10.

In other prior art examples of utility snowmobiles (not illustrated), the bumper 44 was designed to extend from the front end 14 of the snowmobile 10 to the rear end 54 of the bottom pan 50. So constructed, the bumper 44 was a rigid element, connected to the frame 12, that extended around the front end 14 of the snowmobile 10. In other words, the bumper 44 was a large U-shaped member that extended from one side of the snowmobile 10 to the other. As a result, the rider could grasp the front end 14 of the snowmobile 10 at any location to lift the front end 14 of the snowmobile 10 and reposition the vehicle during use. While this design proved to be immensely practical, it was not aesthetically attractive.

In every prior art snowmobile, the bumper 44 and the handles 46 were the only locations where a rider could grasp the front end 14 of the snowmobile 10 and lift it from the snow. If the rider tried to lift the vehicle by any of the fairing elements surrounding the engine 26, because the fairing elements typically were made of a light weight plastic, there was a good likelihood that the rider might crack or break the fairing elements. In the past, the fairing elements were designed to withstand a lifting force.

As would be appreciated by those skilled in the art and also by the snowmobile rider, a majority of the weight of the snowmobile 10 is located at the front end 14 of the vehicle. This is due to the fact that the engine 26 is positioned at the front end 14 of the vehicle. Since most of the weight of the vehicle is at the front end 14, it is important to provide as many lifting points at the front end 14 of the vehicle as possible. For aesthetic reasons, it is also important to design the lifting points so that they do not diminish the overall appearance of the vehicle.

FIG. 2 shows the construction of one prior art bottom pan 50. The bottom pan 50, which is one of the fairing elements of the snowmobile 10, has a front end 52 and a rear end 54. The front end 52 of the bottom pan 50 is designed such that the front bumper 44 extends forwardly thereof. In the drawing, the conventional bottom pan 50 is shown with a front portion 56, a left side portion 58 and a right side portion 60. The left and right side portions 58, 60 are integrally molded together with the front portion 56. As shown, the front, left side and right side portions 56, 58, 60 are provided with a plurality of holes 62 at an interior periphery thereof. The holes 62 are provided so that the bottom pan 50 may be connected to the engine cradle of the snowmobile 10. Once assembled, the bottom pan 50 prevents snow from entering the engine compartment, thereby protecting the engine 26.

In the conventional snowmobile 10, because the bottom pan 50 is constructed as a single unit including the front portion 56, the left side portion 58 and the right side portion 60, if the bottom pan 50 is damaged during operation, the entire bottom pan 50 must be replaced. As a result, the snowmobile owner incurs a high expense when replacing the bottom pan 50.

In view of the foregoing, there are two deficiencies identified in the prior art for which a solution is desired. In the first instance, there is a desire for the construction of a snowmobile that provides lifting locations at the front end of the vehicle. As indicated, this permits the rider to pull the snowmobile from the snow or to manually correct the travel direction of the snowmobile. In the second instance, there is a desire for the construction of the bottom pan of a snowmobile to minimize the replacement cost of that fairing element.

SUMMARY OF THE INVENTION

In view of the foregoing, it is one aspect of the present invention to provide a snowmobile that incorporates at least one lifting handle at the front of the vehicle so that a rider may more easily lift the vehicle.

It is another aspect of the present invention to incorporate lifting handles in the ski wells at the front end of the snowmobile.

To that end, the present invention provides, among other things, a snowmobile with a frame that supports an engine. The snowmobile also includes an endless track operatively connected to the engine to propel the frame. At least one ski is disposed on the frame to steer the frame. To enclose the engine, at least one fairing is attached to the frame. At least one ski well is incorporated in the at least one fairing. At least a portion of a front suspension is disposed within the ski well. The at least one ski is disposed on the front suspension. A lifting handle is incorporated into the at least one ski well to permit lifting of the frame's front end by a rider.

Another aspect of the present invention to provide a snowmobile with a frame that supports an engine. The snowmobile also includes an endless track operatively connected to the engine to propel the frame. At least one ski is disposed on the frame to steer the frame. To enclose at least a portion of the engine, a bottom pan is attached to the frame. At least one ski well is incorporated in the bottom pan. At least a portion of a front suspension is disposed within the ski well. The at least one ski is disposed on the front suspension. A lifting handle is incorporated into the at least one ski well to permit lifting of the frame's front end.

One other aspect of the present invention is to provide a bottom pan that comprises at least two separate components that are attached to the snowmobile frame.

Yet another aspect of the present invention is to provide a bottom pan having a ski well adapted to carry one of many accessories.

Still other aspects of the present invention will be made more apparent from the description that follows.

DESCRIPTION OF THE DRAWINGS

In the drawings, which form a part of the instant disclosure, like reference numbers are intended to refer to like parts. As will be made clear, the drawings are not meant to limit the scope of the present invention. To the contrary, the drawings are meant to be illustrative of the broad applicability of the present invention, in which:

FIG. 10 is a partial cross-section of the left-side ski well as taken through cut 10—10 shown in FIG. 5 showing the lifting handle and reinforcing bar.

DESCRIPTION OF EMBODIMENTS OF THE INVENTION

Figure 1:
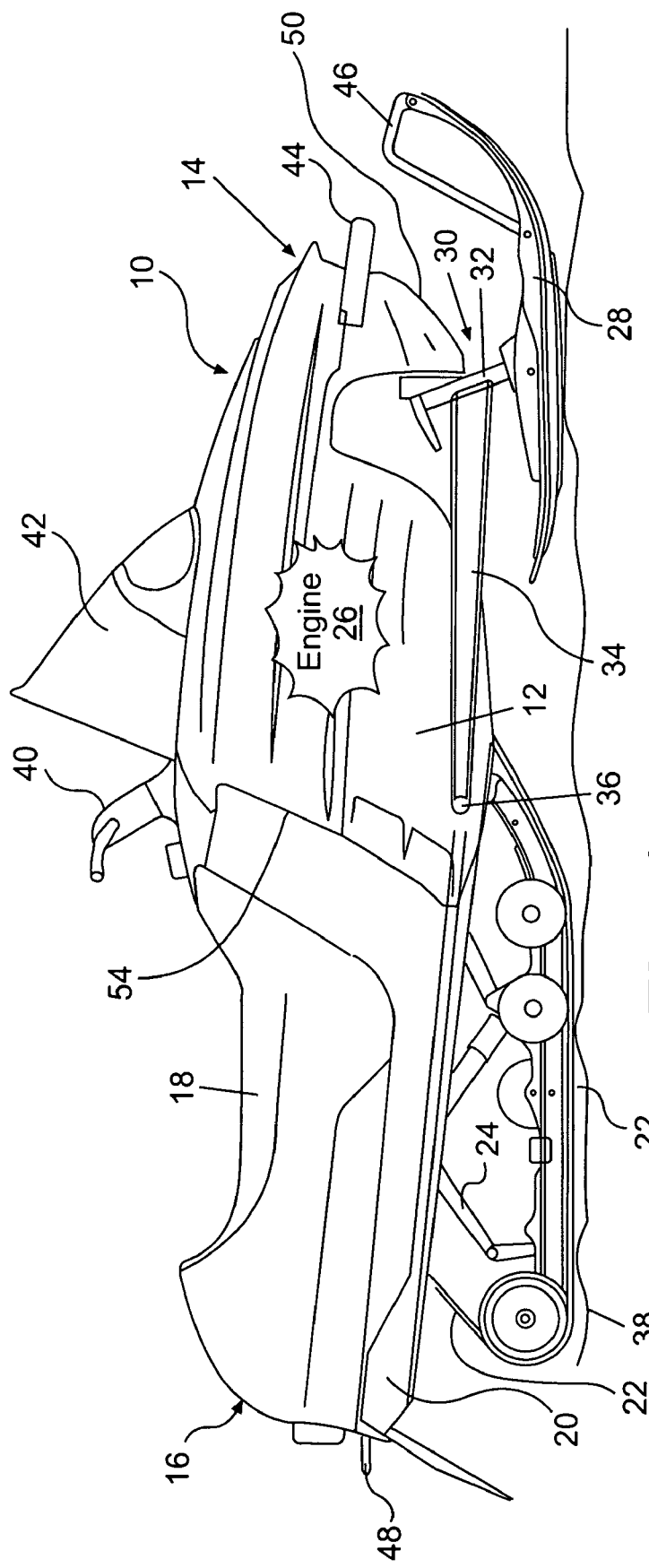
FIG. 1 is a side view of a conventional snowmobile.
Figure 2:
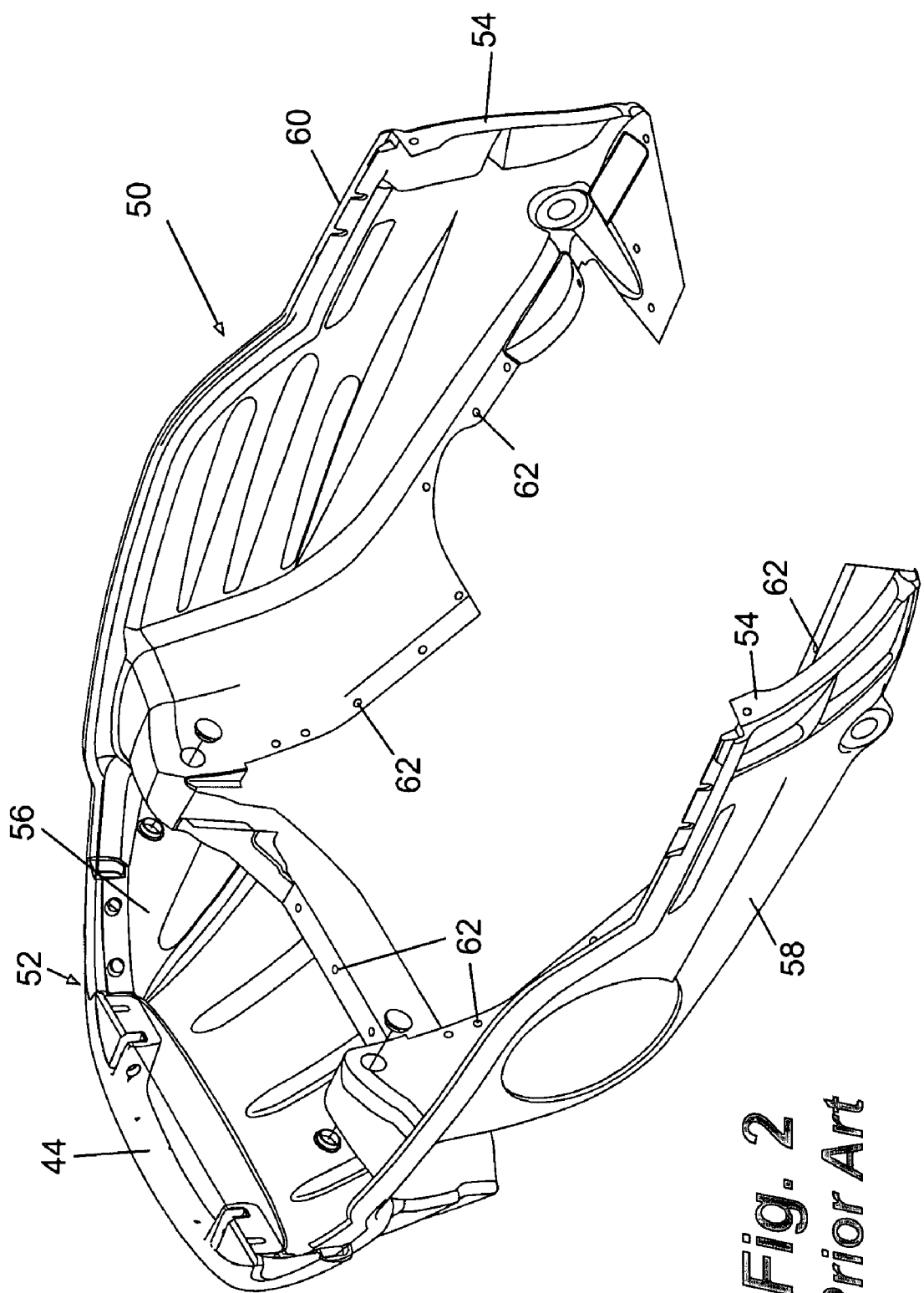
FIG. 2 is a perspective rear view, from the rear left side, of one example of a bottom pan typically included on a conventional snowmobile, like the one illustrated in FIG. 1.
Figure 3:
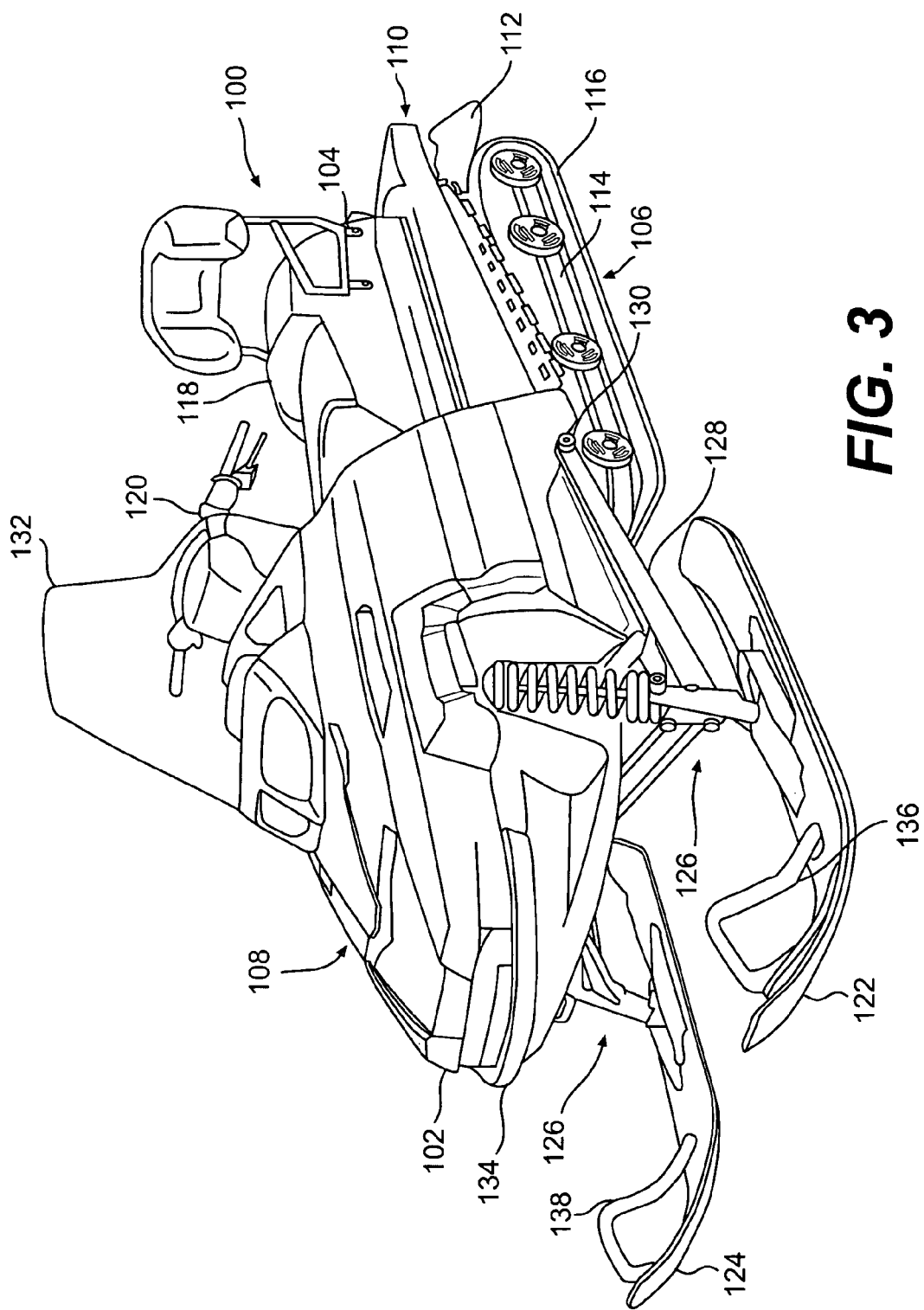
FIG. 3 is a perspective illustration of a snowmobile constructed according to the teachings of the present invention.

FIG. 3 provides a perspective illustration of a snowmobile 100 constructed according to the teachings of the present invention. The snowmobile 100 is known as a utility snowmobile. However, as would be appreciated by those skilled in the art, the present invention is not limited in its application only to utility snowmobiles. To the contrary, as would be appreciated by those skilled in the art, the present invention may be applied to other types of snowmobiles including, for example, touring snowmobiles and racing snowmobiles.

Throughout the drawings reference to the front end, rear end, left side and right side of the vehicle are made with reference to the normal travel direction of the snowmobile 100 during normal, forward operation.

The snowmobile 100 has a front end 102, a rear end 104, a left side 106, and a right side 108. The snowmobile 100 is constructed with a frame 110 that includes a tunnel 112 at its rear end. As would be appreciated by those skilled in the art, the tunnel is an inverted, U-shaped structure that is disposed above a rear suspension 114. An endless track 116, which is operatively connected to the engine (not shown) at the front end 102 of the snowmobile 100, is disposed on the rear suspension 114 in a manner known to those skilled in the art. A seat 118 is disposed on the tunnel 112.

A steering handlebar 120 is positioned in front of the seat 118 so that the snowmobile rider may steer the snowmobile 100. The steering handlebar 120 is operatively connected to the left and right skis 122, 124 that are disposed at the front end 102 of the snowmobile 100. As in the prior art snowmobile 10, the skis 122, 124 are disposed on a front suspension 125, which includes, among other elements, a leg 126 and a trailing arm 128 on both sides thereof. The trailing arm 128 is fixedly connected to the leg 126 and is pivotally connected to the frame 110 of the snowmobile 100 through a pivot joint 130.

FIG. 3 also illustrates the position of a windshield 132, which is disposed in front of the steering handlebar 120. As in the conventional vehicle, the windshield 132 establishes a wind screen to protect the rider from the wind as the vehicle travels forward.

The snowmobile 100 also includes a front bumper 134 and a rear bumper (not shown), just like the snowmobile 10. As with the bumpers 44, 48 on the conventional snowmobile 10, the front bumper 134 and the rear bumper provide two locations where the front and rear ends of the snowmobile 100 may be lifted so that the travel direction of the snowmobile 100 may be corrected. In addition, as in the conventional snowmobile 10, the left and right skis 122, 124 are provided with left and right handles 136, 138. The handles 136, 138 provide two additional lifting locations on the snowmobile 100.

Figure 4:
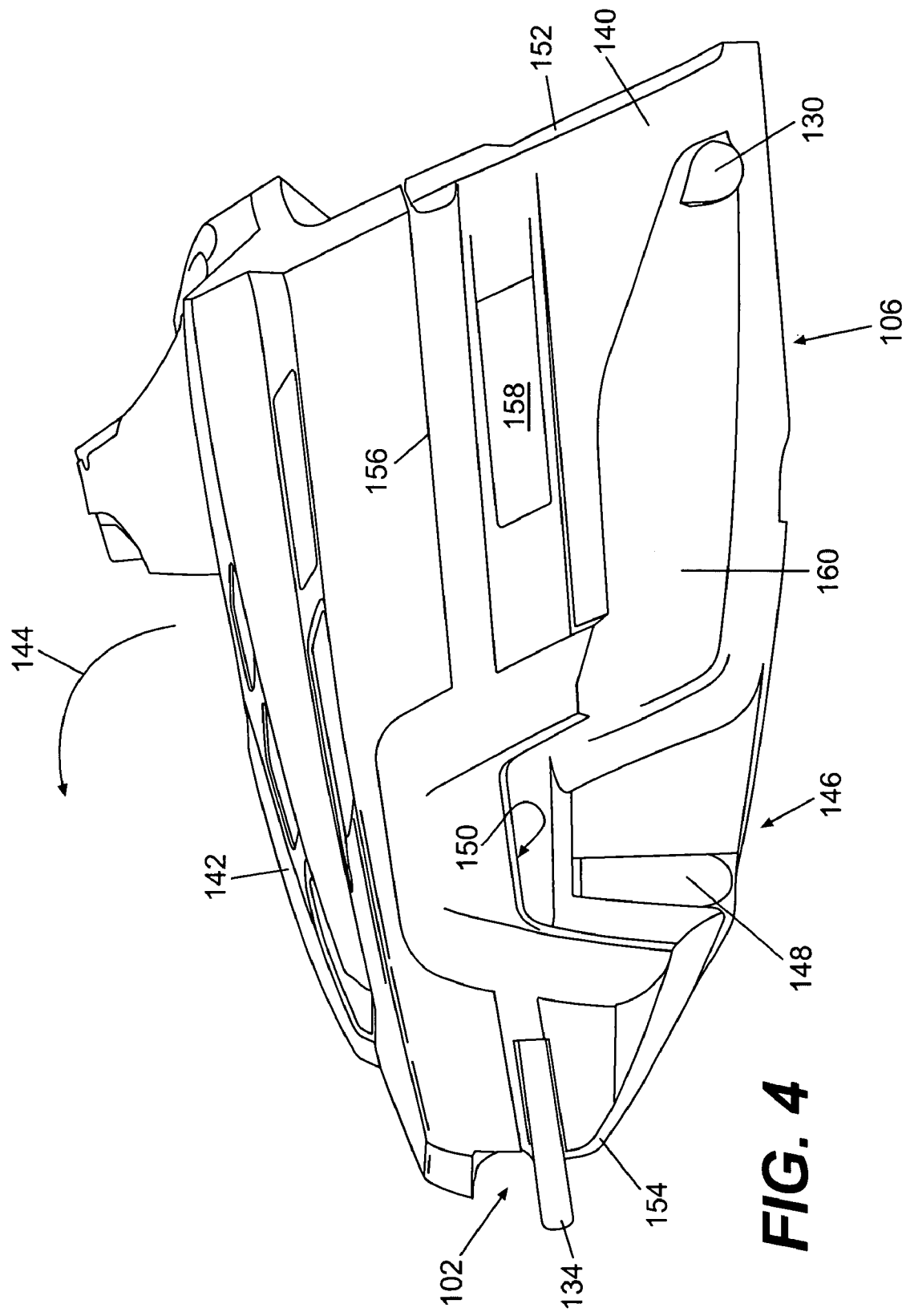
FIG. 4 is a left side view of the front end of the snowmobile illustrated in FIG. 3, showing the bottom pan and hood in greater detail.

FIG. 4 is a left side view illustration of a portion of the snowmobile 100 illustrated in FIG. 3. In particular, FIG. 4 is a left side view illustration of the front end 102 of the snowmobile 100, illustrating the bottom pan 140 and the hood 142. The bottom pan 140 and the hood 142 are connected to the frame 110 such that the hood 142 pivots forwardly in the direction of the arrow 144. The hood 142 opens in this manner so that access may be provided to the engine.

As illustrated in FIG. 4, the bottom pan 140 of the front end 102 of the snowmobile 100 includes a ski well 146, which houses a portion of the front suspension 125. The ski well 146 includes an opening 148 through which portions of the front suspension 125 protrude, which connect to the leg 126 and the trailing arm 128. The location of the pivot joint 130 is also illustrated. As shown in FIG. 3, the trailing arm 128 extends from the ski well 146 to the pivot joint 130.

The ski well 146 also incorporates a lifting handle 150 at the topmost portion thereof. The lifting handle 150 will be described in greater detail below. As illustrated, the bottom pan 140 and the hood 142 meet one another at seam 156, which extends from a rear portion 152 of the bottom pan to the front portion 154 of the bottom pan 140. To accommodate the ski well 146 and the lifting handle 150, the seam 156 extends upwardly around the lifting handle 150.

The bottom pan 140 also includes a vent 158 therethrough. The vent 158 permits air to enter into and exit from the engine compartment created by cooperation between the bottom pan 140 and the hood 142. In the preferred embodiment, the vent 158 connects to the engine compartment via a suitable element that discourages snow from entering the engine compartment. The suitable element may be, for example, an air passage with a convoluted path or may be a grate, as would be appreciated by those skilled in the art.

Figure 5:
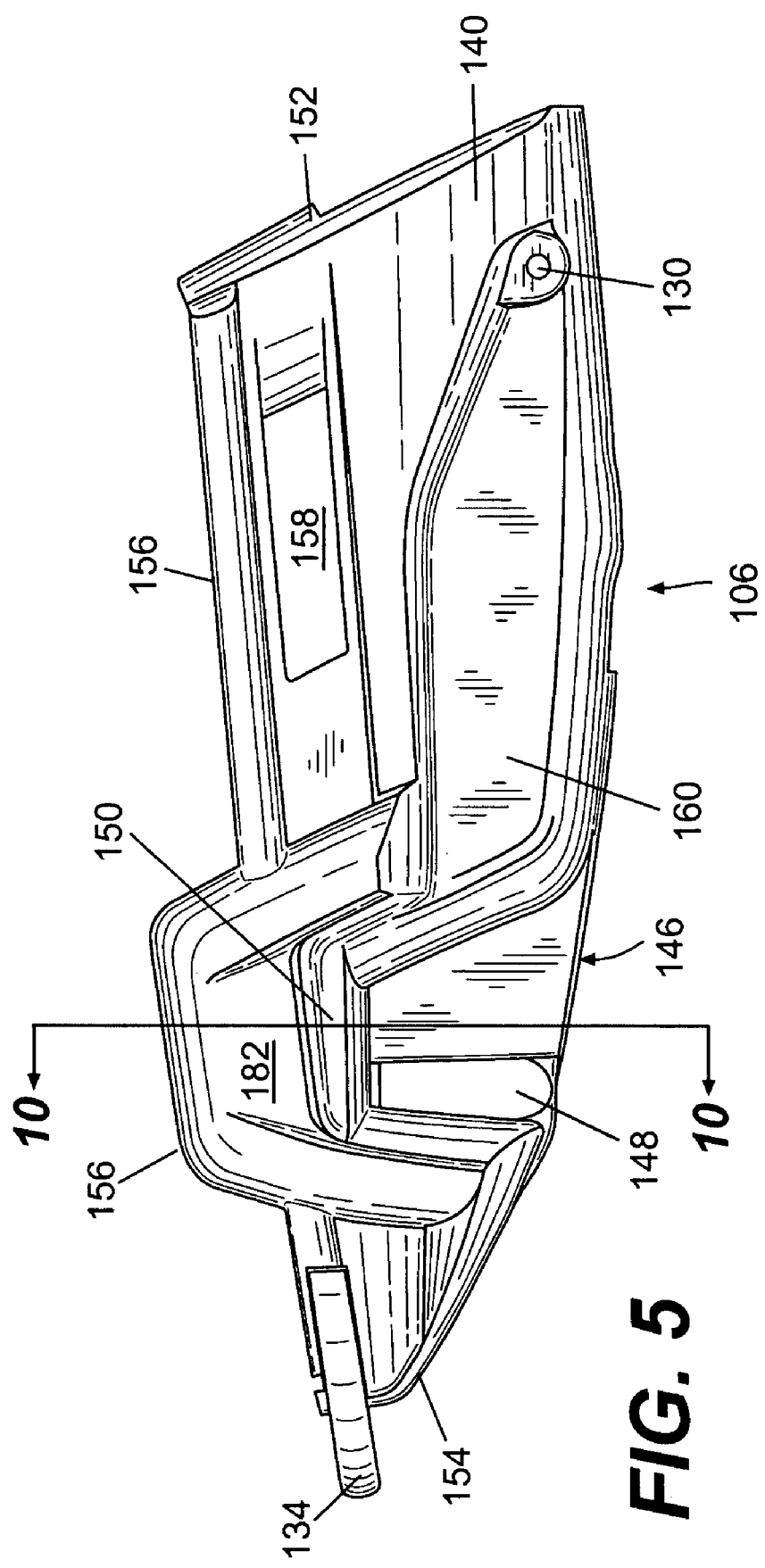
FIG. 5 is a left side view of the bottom pan of the snowmobile depicted in FIG. 3.

FIG. 5 is a left side view of the bottom pan 140 of the snowmobile 100 illustrated in FIG. 3.

As shown in FIGS. 4 and 5, the bottom pan 140 includes an indentation 160 that extends from the ski well 146 to the pivot joint 130. The indentation 160 permits the trailing arm 128 to pivot upwardly and downwardly without impacting the bottom pan 140 during operation of the snowmobile 100.

Also shown in FIG. 5, ski well 146 has a flat vertical surface portion 182 between the lifting handle 150 and the seam 156. Surface 182 could be used to secure different accessories to bottom pan 140. While not shown, accessories such as a spot light or a holder for holding a particular tool could be attached to bottom pan 140 via surface 182.

Figure 6:
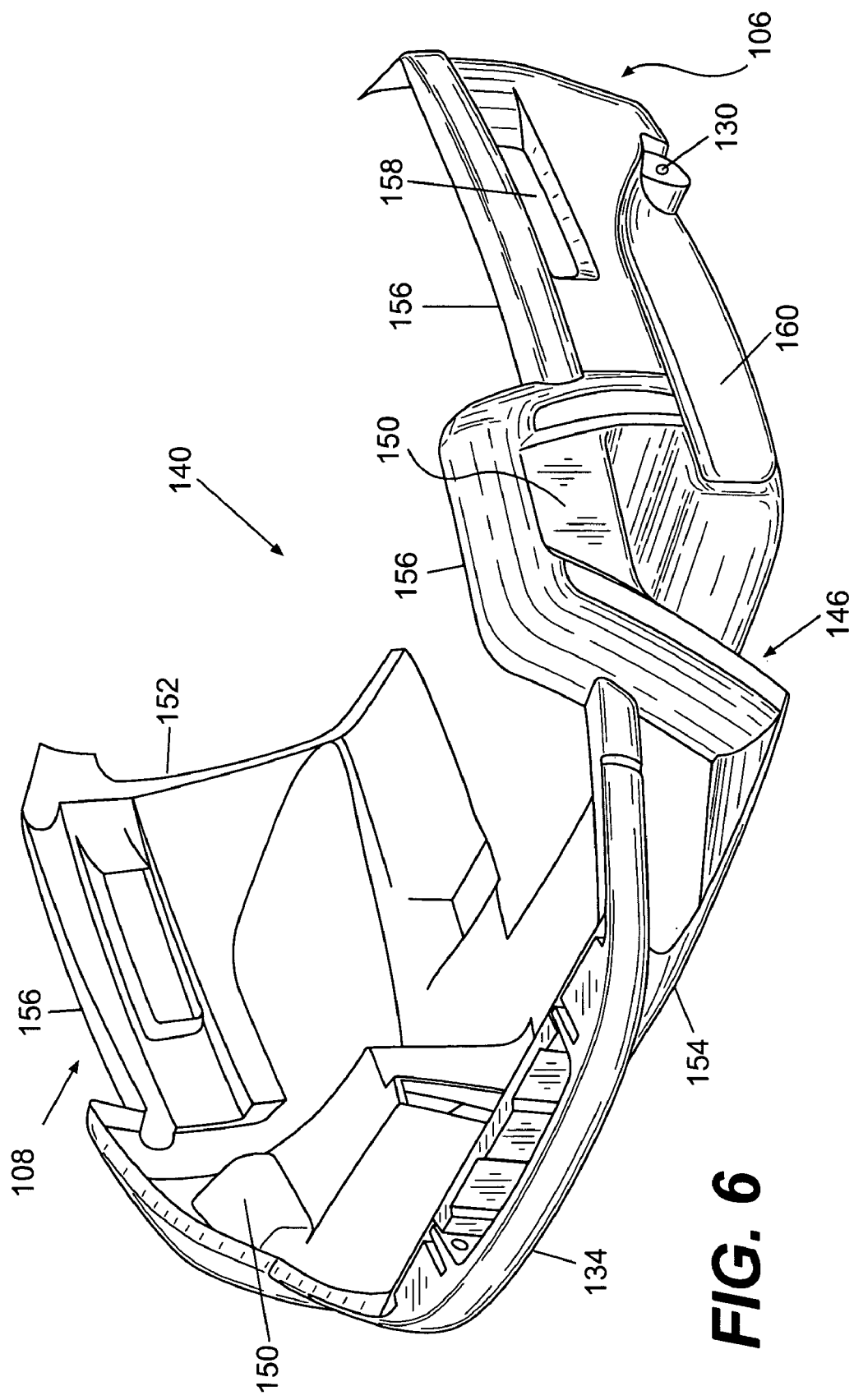
FIG. 6 is a perspective illustration of the bottom pan shown in FIG. 5.

FIG. 6 is a perspective illustration of the bottom pan 140 of the snowmobile 100 illustrated in FIG. 3. The left and right sides 106, 108 of the bottom pan 140 are more clearly illustrated in this drawing than in FIGS. 4 and 5. In addition, the lifting handles 150 are more readily distinguished from the remainder of the bottom pan 140.

Figure 7:
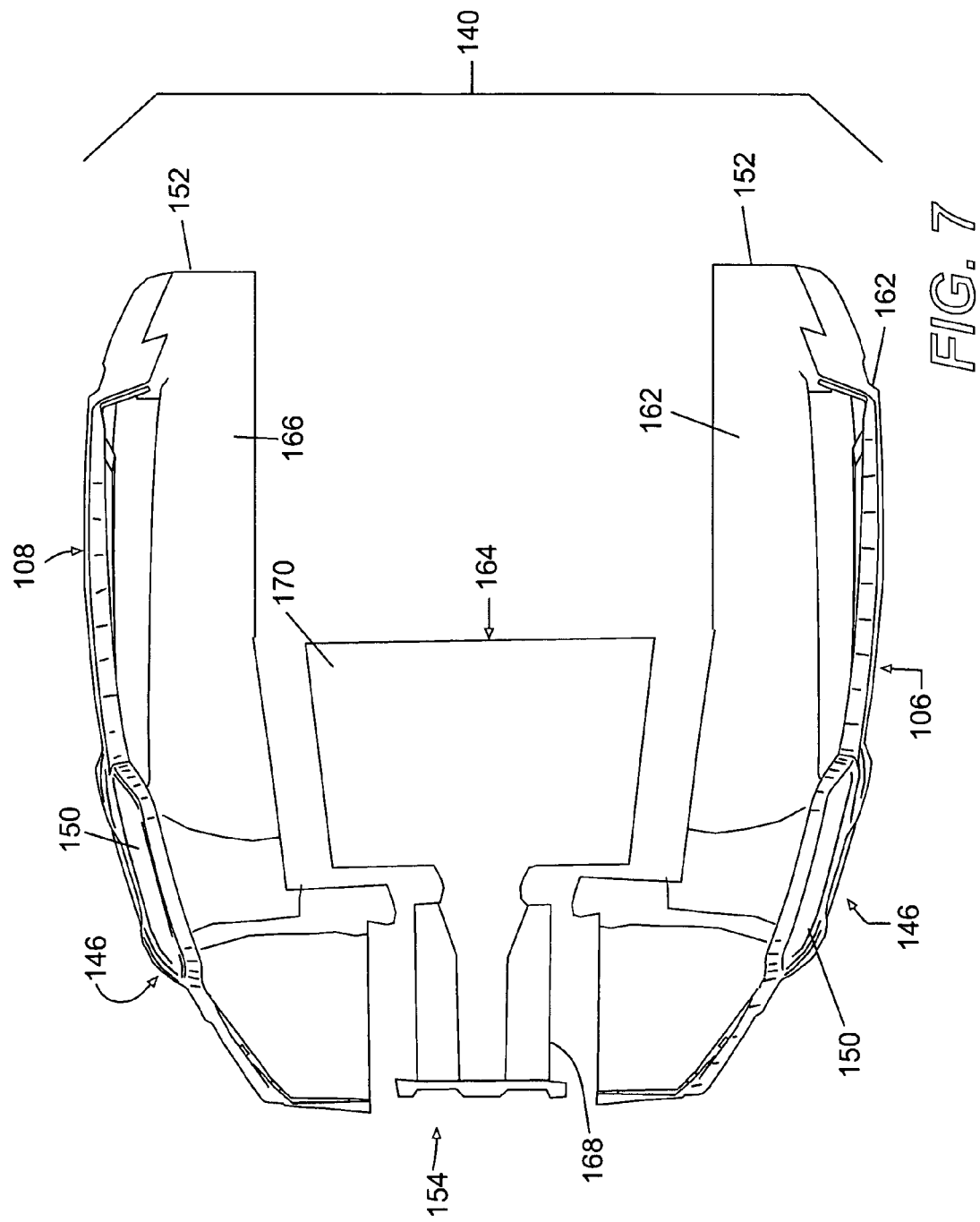
FIG. 7 is a top view of the bottom pan shown in FIGS. 5 and 6, illustrating in detail the three portions that make up the bottom pan.

FIG. 7 is a top view of the bottom pan 140 illustrated in FIGS. 4–6. In this view, the bottom pan 140 is illustrated in a preassembled state. The bottom pan 140 is made up of at least three components, a left side portion 162, a central portion 164, and a right side portion 166. As would be appreciated by those skilled in the art, while the bottom pan 140 is shown with three portions assembled together, the bottom portion may comprise a number of portions greater than two without deviating from the scope of the present invention.

The three portions 162, 164, 166 preferably are connected together via suitable fasteners such as screws and bolts. Alternatively, the portions 162, 164, 166 may be connected to one another via other types of removable fasteners known in the art. It is also possible that the three portions 162, 164, 166 may be connected together by a glue or adhesive. Instead of being connected together, it is also contemplated that the three portions 162, 164, 166 may be connected to the frame 110 of the snowmobile 100 via any suitable fastener known to those skilled in the art.

As illustrated in FIG. 7, the left and right portions 162, 166 of the bottom pan 140 extend from the front portion 154 to the rear portion 152, encompassing the ski wells 146. The left and right side portions 162, 166 also encompass the lifting handles 150 at the tops of the ski wells 146. The central portion 164 has a forward portion 168 that connects between the left and right portions 162, 166 at the front end 154 of the bottom pan 140. A rear portion 170 of the central portion 164 also extends between the left and right side portions 162, 166 of the bottom pan 140. The rear portion 170 extends to the engine cradle 171 within the engine compartment.

Figure 8:
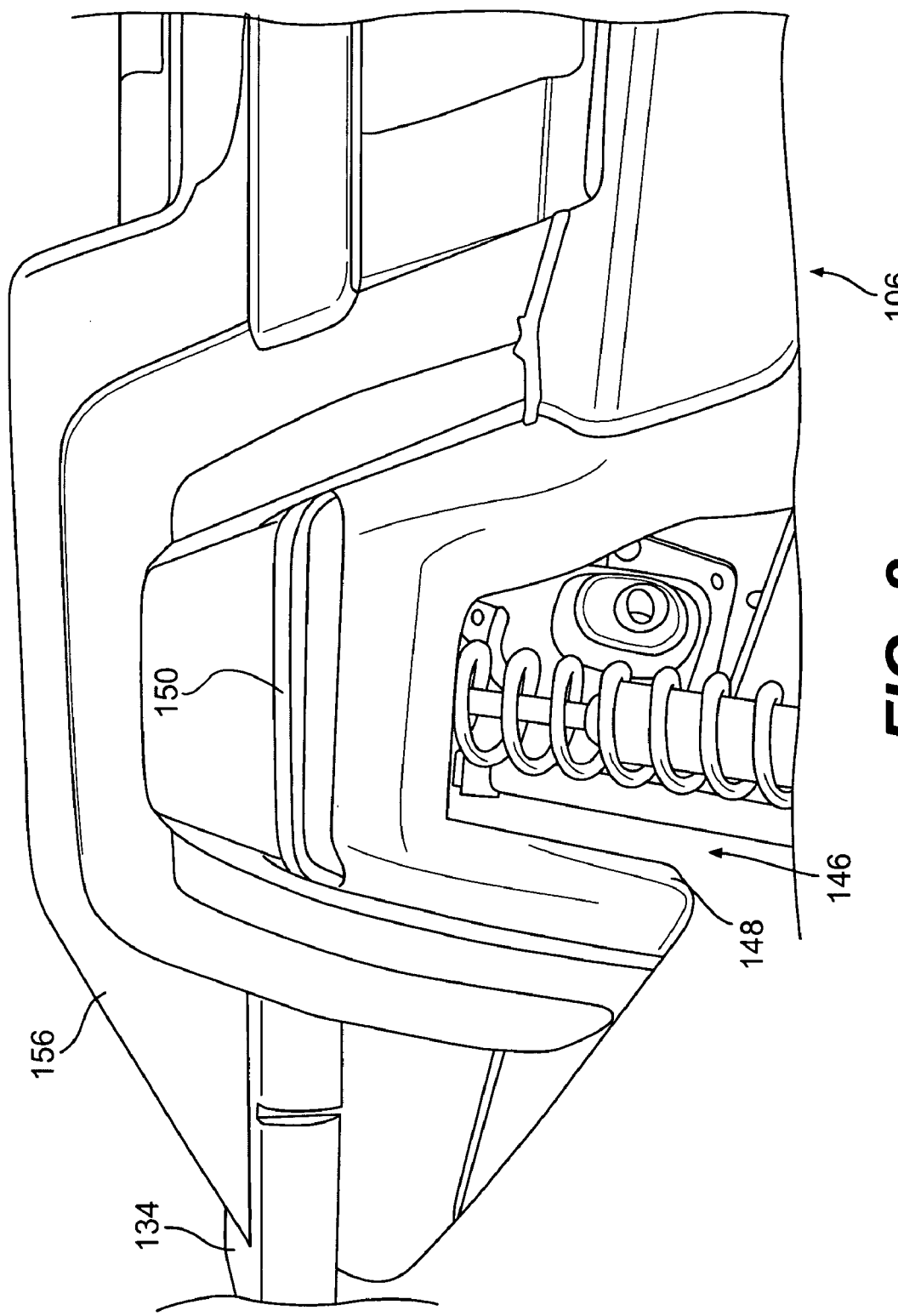
FIG. 8 is a left side view of the front end of the snowmobile of the present invention, showing the left side lifting handle incorporated into the bottom pan of the snowmobile.

FIG. 8 is a left side view of the lifting handle 150 incorporated in the bottom pan 140 of the snowmobile 100 depicted in FIG. 3. As shown, the lifting handle 150 is positioned at the top of the ski well 146 such that the rider may slip his hands under the lifting handle 150 to lift the front end 102 of the snowmobile 100 from the snow.

Figure 9:
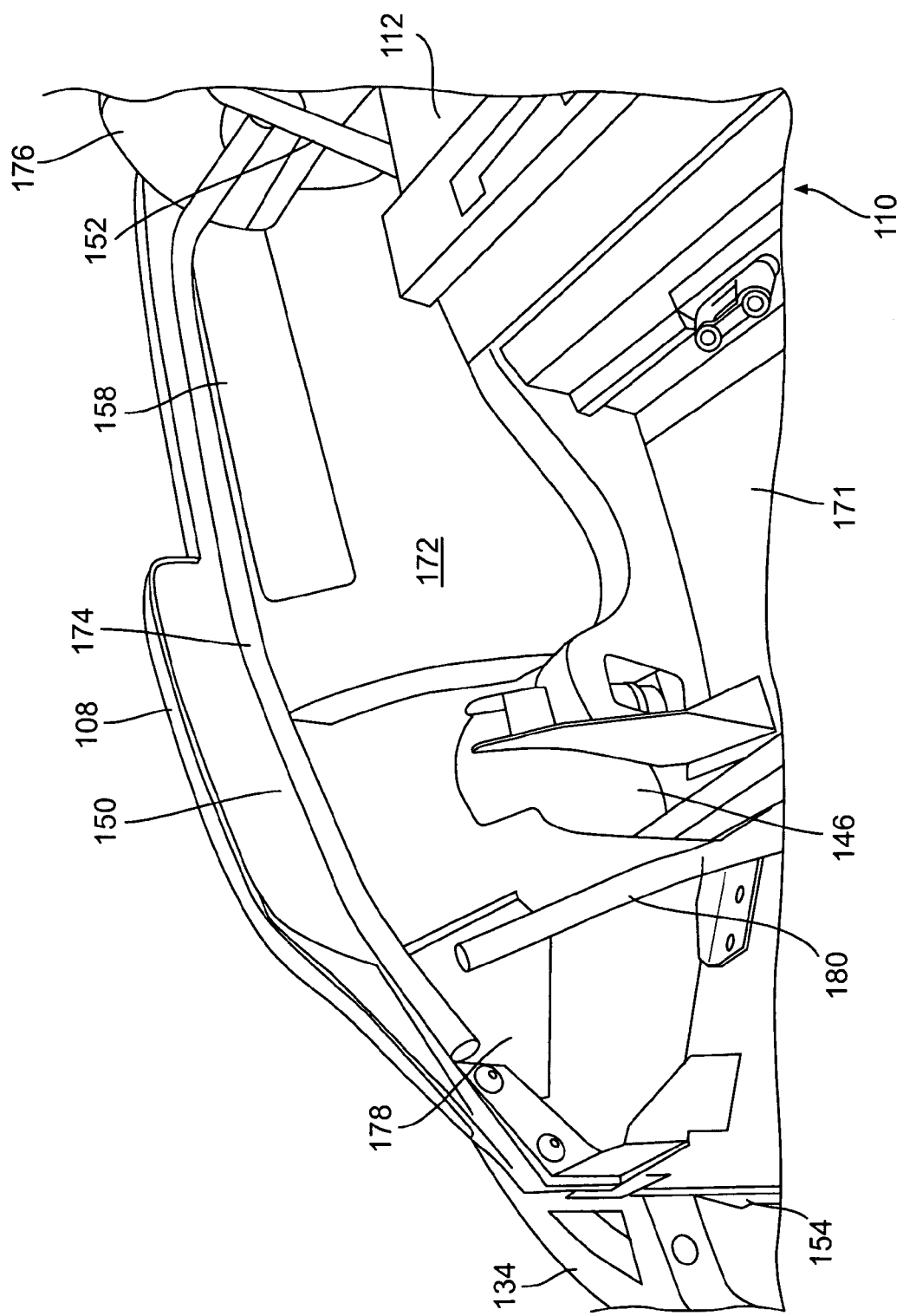
FIG. 9 is a perspective view of the interior of the right hand side of the bottom pan of the present invention, showing the reinforcing bar connected to the frame to reinforce the right side lifting handle incorporated into the bottom pan.

FIG. 9 illustrates the interior 172 of the left side portion 162 of the bottom pan 140 of the snowmobile 100 illustrated in FIG. 3. So that the lifting handle 150 may support the weight of the front portion 102 of the snowmobile 100, the bottom pan 140 incorporates a reinforcing bar 174 that extends from the rear portion 152 of the bottom pan 140 to the front portion 154. As shown, the reinforcing bar 174 attaches to an upright member 176 that is connected to the tunnel 112. The upright portion 176 may be an upright that supports the steering handlebar 120 in front of the seat 118.

As illustrated in FIG. 9, the reinforcing bar 174 is tubular. In particular, the reinforcing bar 174 has a circular cross-section. As would be appreciated by those skilled in the art, the reinforcing bar 174 may have any alternative cross-sectional shape including, for example, square, rectangular, polygonal, elliptical, ovoid, etc.

In the alternative, the reinforcing bar 174 may be connected to any suitable part of the frame 110 of the snowmobile 100 without departing from the scope of the present invention. All that is required for the reinforcing bar 174 is that the bar be connected to a portion of the snowmobile that can support, at least partially, the weight at the front end 102 of the snowmobile 100. In this manner, the reinforcing bar 174 prevents the bottom pan 140 from cracking when the rider lifts the snowmobile 100 at the lifting handle 150. As would be recognized by one skilled in the art, reinforcing bar 174 could be eliminated if the bottom pan 146 of the present invention including lifting handles 150 was constructed from a material strong enough to support the weight of the vehicle when lifted by the lifting handles 150.

At the front end 154 of the bottom pan 140, the reinforcing bar 174 is connected to a bracket 178 via a weld (or other suitable fastener). The bracket 178, in turn, is connected to a forward upright 180 which is connected to the engine cradle 171. The engine cradle 171 is attached to the forward end of the tunnel 112. Together, the engine cradle 171 and the tunnel 112 comprise a large portion of the frame 110.

With the reinforcing bar 174 connected to the uprights 176, 180, the reinforcing bar 174 is connected at two points on the frame 110. As a result, the reinforcing bar 174 can support the weight of the front end 102 of the snowmobile 100 so that the rider may lift the front end 102 via the lifting handles 150.

FIG. 10 illustrates a partial cross-section of the bottom pan 140 of the present invention. Lifting handles 150 of bottom pan 140 preferably include a channel or indentation 184 to facilitate the lifting of the snowmobile 100 by using the lifting handles 150. Channel 184 will allow the fingers of the lifters hands to better grip the lifting handles 150. It is contemplated that the surface of the bottom pan 140, near the lifting handles 150, could be covered with an abrasive material to prevent the fingers from slipping against the bottom pan 140. FIG. 10 also shows the reinforcing bar 174 passing between the outer surface 182 of the ski well 146 and the channel 184 to support the weight of the vehicle while being lifted, preventing the bottom pan 140 from breaking.

As the above indicates, there are at least two advantages offered by the present invention. First, the lifting handles 150 provide additional locations on the snowmobile 100 that the rider may grasp with his or her hands to lift the front end 102 of the vehicle. This greatly facilitates operation of the snowmobile 100 in a variety of conditions normally encountered, for example, when snowmobiling, when positioning the snowmobile 100 on a trailer (or in a truck) and when storing the snowmobile 100 in a garage. Second the multi-part construction of the bottom pan 140 reduces the cost of replacing the bottom pan 140 should it become damaged during use. In the snowmobile 100 of the present invention, if the left side of the bottom pan 140 becomes damaged, only the left side portion 162 needs to be replaced. This greatly reduces the replacement cost of that portion of the fairings on the snowmobile 100.

The above discussion is not meant to be limiting, in any way, of the present invention. While specific embodiments are described, those skilled in the art will readily appreciate the breadth of the present invention and its wide applicability to snowmobiles.

What is claimed is:

1. A snowmobile, comprising:
   a frame with a front end;
   an engine disposed on the frame;
   an endless track operatively connected to the engine to propel the snowmobile;
   at least one fairing attached to the frame to at least partially enclose the engine;
   at least one ski well formed in the at least one fairing;
   a front suspension system connected to the frame, at least a portion of which is disposed within the ski well;
   at least one ski disposed on the front suspension system; and
   a lifting handle formed in the at least one ski well, the at least one fairing being reinforced in a region of the lifting handle to permit lifting of the frame's front end.

2. The snowmobile of claim 1, wherein the lifting handle further comprises an indentation to form a finger hold when lifting the frame's front end.

3. The snowmobile of claim 2, wherein the at least one fairing is reinforced by disposing a reinforcing bar adjacent an interior surface thereof to reinforce the lifting handle.

4. The snowmobile of claim 3, wherein the reinforcing bar is placed between the interior surface of the at least one fairing and the indentation.

5. The snowmobile of claim 4, wherein: the frame includes a tunnel, and an engine cradle is attached to and extends forwardly from a front end of the tunnel.

6. The snowmobile of claim 5, wherein the reinforcing bar is attached to the tunnel at a first end thereof and attached to the engine cradle at a second end thereof.

7. The snowmobile of claim 6, wherein: the reinforcing bar is tubular.

8. The snowmobile of claim 1, wherein the snowmobile further comprises a left side and a right side;
   the at least one ski well comprises a first ski well on the right side of the snowmobile and a second ski well on the left side of the snowmobile, at least a portion of the front suspension system disposed within the first ski well and at least a portion of the front suspension system disposed within the second ski well; and
   the at least one ski further comprises a first ski on the right side of the snowmobile and a second ski on the left side of the snowmobile.

9. A snowmobile, comprising:
   a frame with a front end;
   an engine disposed on the frame;
   an endless track operatively connected to the engine to propel the snowmobile;
   a bottom pan attached to the frame to enclose at least a portion of the engine;
   at least one ski well formed in the bottom pan;
   a front suspension system connected to the frame, a portion of which is disposed within the ski well;

at least one ski disposed on the front suspension system; and a lifting handle formed in the at least one ski well, the bottom pan being reinforced in a region of the lifting handle to permit lifting of the frame's front end.

10. The snowmobile of claim 9, wherein the lifting handle further comprises an indentation to form a finger hold when lifting the frame's front end.

11. The snowmobile of claim 10, wherein the bottom pan is reinforced by disposing a reinforcing bar adjacent an interior surface thereof to reinforce the lifting handle.

12. The snowmobile of claim 11, wherein: the reinforcing bar is tubular.

13. The snowmobile of claim 12, wherein:
the frame includes a tunnel, and
an engine cradle is attached to and extends forwardly from a front end of the tunnel.

14. The snowmobile of claim 13, wherein the reinforcing bar is attached to the tunnel at a first end thereof and attached to the engine cradle at a second end thereof.

15. The snowmobile of claim 9, wherein the bottom pan comprises:

a left side portion;

a central portion; and a right side portion, wherein the left side portion, the right side portion, and the central portion form a contiguous surface when assembled together on the frame.

16. The snowmobile of claim 9, wherein the snowmobile further comprises a left side and a right side;

the at least one ski well further comprises a first ski well on the right side of the snowmobile and a second ski well on the left side of the snowmobile, at least a portion of the front suspension system disposed within the first ski well and at least a portion of the front suspension system disposed within the second ski well; and the at least one ski further comprises a first ski on the right side of the snowmobile and a second ski on the left side of the snowmobile.

* * * * *